D. B. NEAL
Cotton-Planter.

No. 19.438.  Patented Feb. 23. 1858.

UNITED STATES PATENT OFFICE.

DANIEL B. NEAL, OF MOUNT GILEAD, OHIO.

IMPROVEMENT IN COTTON-SEED PLANTERS.

Specification forming part of Letters Patent No. 19,438, dated February 23, 1858.

*To all whom it may concern:*

Be it known that I, DANIEL B. NEAL, of Mount Gilead, in the county of Morrow and State of Ohio, have invented certain new and useful Improvements in Cotton-Seed Planters; and I do hereby declare that the following is a full, clear, and exact description of the same, reference being had to the accompanying drawings, and to the letters of reference marked thereon.

The nature of my invention consists in the arrangement of certain devices, the peculiarities of which will be hereinafter described.

In order that others skilled in the arts may use and manufacture my invention, I will proceed to describe its operation and construction.

Figure 1:
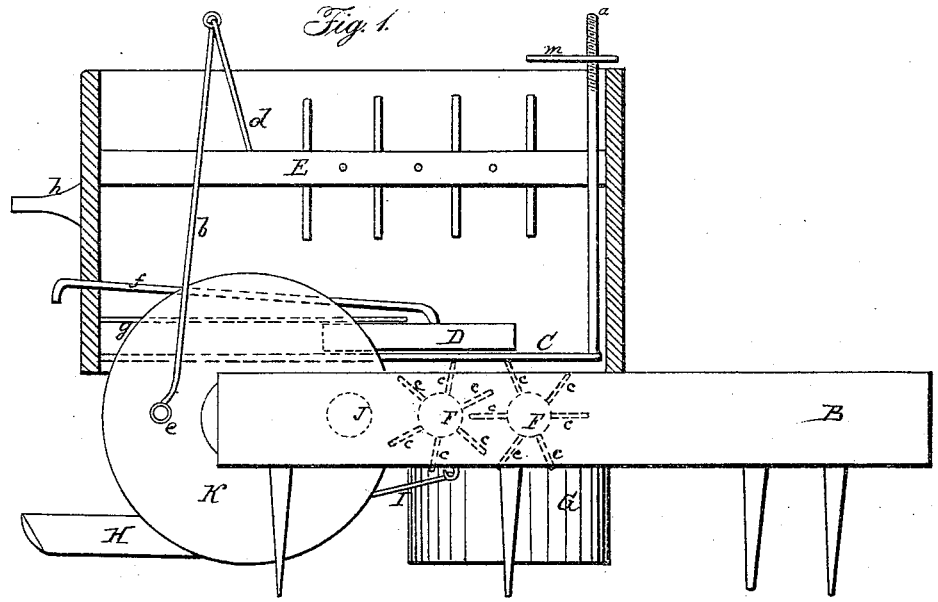
Figure 2:
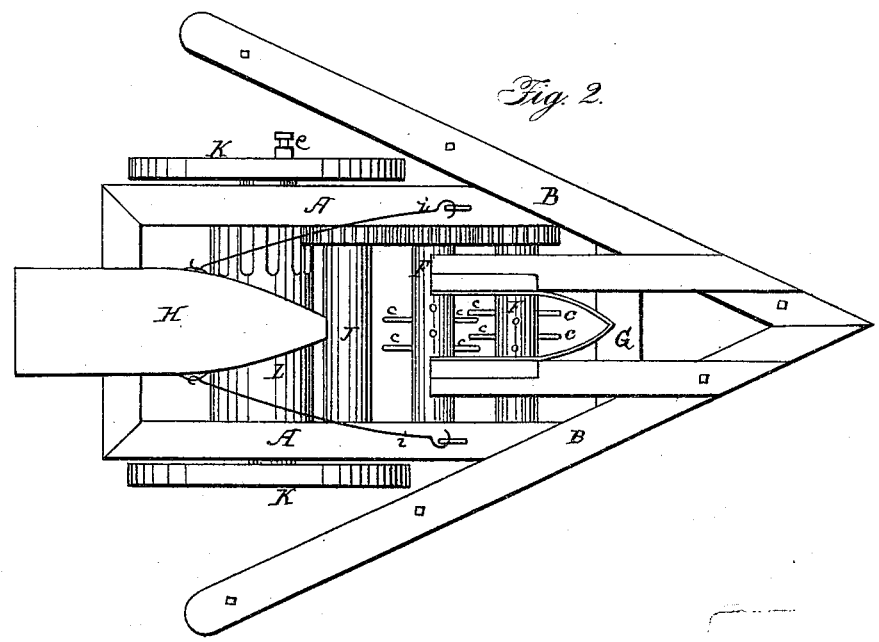

In the accompanying drawings, which make a part of this specification, Figure 1 is a side elevation with one side of the seed-box removed, showing the internal arrangement of the two bottoms and the slide, and also the stirrer. Fig. 2 is a bottom view of the machine, showing the position of the cover.

In Fig. 1, F F represent two cylinders, which are provided with arms or teeth $c\,c\,c\,c$, said cylinders being operated by means of cog-wheels, as seen in Fig. 2. The teeth $c\,c$ on these cylinders are for the purpose of conveying the seed from the seed-hopper into the seed-spout G; thence they fall to the ground. K is the driving-wheel. J is a cylinder, to which is attached a cog-wheel, which serves to connect the shaft of wheel K with the cylinders F, conveying motion from K to F F. C is a movable bottom, having a rod attached to one end of it, said rod having a screw cut upon its upper extremity for the purpose of elevating or lowering the bottom C; $m$ being a nut which works on the screw $a$ on rod attached to bottom C. D is a sliding cover, which is operated by means of rod $f$ for the purpose of covering an aperture in the bottom C, through which the grain passes to the cylinders. $g$ is one bottom of the machine, said bottom being hinged at its rear extremity, and playing up and down to accommodate itself to the change of position of the bottom C and the cover D, when necessary. E is a stirrer. $b$ is a rod attached to the driving-wheel K at the point $e$, said rod having a loop on its upper extremity. $d$ is a rod secured to the stirrer E, and works in the loop on the end of rod $b$. Motion is given to the stirrer by means of the rods $b$ and $d$. $h$ is the handle of the machine. H is a hanging coverer, which drags behind the machine and serves to cover the grain with earth. I is a rod securing the coverer H to the machine. G is a seed-tube, which conveys the seed to the ground. B represents a harrow connected with the machine for preparing the ground.

In Fig. 2, A A represent the frame of the machine; B, the sides of the harrow; K, the driving-wheels; $e'$, the point to which rod $b$ (seen in Fig. 1) is secured to driving-wheel. H is the swinging coverer; I, the rods for the purpose of connecting it to the machine. L represents the shaft of the driving-wheels, said shaft being provided with cogs, as seen. J is a shaft provided with a cog-wheel on one extremity, and connects and conveys motion from L to cylinders F F. F F are cylinders, to which are attached the teeth $c\,c\,c\,c$. $c\,c\,c\,c$ are the teeth for conveying the seed from the hopper. G shows the seed-spout.

In the operation of this machine the seed is placed in the seed-hopper, and the machine being set in motion, motion is communicated by the driving-wheels to shaft J and by shaft J to cylinders F F, said cylinders turning in such a manner that their arms or teeth $c\,c\,c\,c$, coming together, will turn downward and convey the seed from the hopper. It will be seen by reference to Fig. 1 that these teeth $c\,c$ are so arranged and located that when they come together a certain quantity of seed is measured between them each time and conveyed out. The amount of seed which reaches the cylinders F F is regulated by the bottom C and the slide D. The bottom C may be let down so that the teeth $c\,c\,c\,c$ will penetrate the seed-hopper through the aperture in the bottom C, or it may be elevated so that the teeth will not reach up to the bottom C. When the bottom is raised the teeth cannot take out as much seed as when the bottom is lowered and the teeth allowed to penetrate into the seed. The cover D slides between the two bottoms and serves to cover the aperture in the bottom C when said bottom is stationed at any given point, thus giving the operator control of the amount of seed to be sown while the machine is in operation.

Having thus fully described my invention, what I claim as new, and desire to secure by Letters Patent, is—

The arrangement of the adjustable bottoms C and g with the sliding cover D and cylinders F F, all operated as set forth, and for the purpose herein fully described.

DANIEL B. NEAL.

Witnesses:
T. H. DALRYMPLE.
J. M. TALMAGE.